United States Patent
Hesse et al.

(10) Patent No.: US 6,790,806 B2
(45) Date of Patent: Sep. 14, 2004

(54) CORE/JACKET CATALYST MOLDING

(75) Inventors: Michael Hesse, Worms (DE); Rainer Anderlik, Heidelberg (DE); Hans-Gerhard Fritz, Uhingen (DE); Jochen Hammer, Stuttgart (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 135 days.

(21) Appl. No.: 10/046,895

(22) Filed: Jan. 17, 2002

(65) Prior Publication Data

US 2002/0145226 A1 Oct. 10, 2002

(30) Foreign Application Priority Data

Jan. 31, 2001 (DE) .......................................... 101 04 226

(51) Int. Cl.$^7$ ................................................ B01J 21/18
(52) U.S. Cl. ...................... 502/180; 502/300; 502/439; 502/523; 502/527.14; 502/527.15; 502/527.16; 502/527.12; 428/116; 428/373; 264/639; 264/642; 264/670; 264/681; 264/682; 264/683
(58) Field of Search ................................ 502/180, 300, 502/439, 523, 527.14, 527.15, 527.16, 527.12, 527.24; 428/116, 373; 264/639, 642, 670, 681–683

(56) References Cited

U.S. PATENT DOCUMENTS

| | | | | | |
|---|---|---|---|---|---|
| 3,901,821 | A | * | 8/1975 | Retallick ..................... | 252/410 |
| 4,036,784 | A | * | 7/1977 | Gembicki et al. .......... | 252/465 |
| 4,605,594 | A | * | 8/1986 | Owens et al. ............... | 428/373 |
| 5,763,351 | A | * | 6/1998 | Ichimura .................... | 502/303 |
| 5,783,139 | A | * | 7/1998 | Curran ....................... | 264/625 |
| 5,989,412 | A | * | 11/1999 | Okagami et al. ........ | 208/251 H |
| 6,054,094 | A | * | 4/2000 | Towata et al. .............. | 264/638 |
| 6,107,239 | A | * | 8/2000 | Qin et al. ................... | 502/300 |
| 6,169,214 | B1 | * | 1/2001 | Tenten et al. ............... | 568/476 |
| 6,211,113 | B1 | * | 4/2001 | Harth et al. ................ | 502/200 |
| 6,297,185 | B1 | * | 10/2001 | Thompson et al. ......... | 502/101 |
| 6,403,018 | B1 | * | 6/2002 | Goretta et al. ............. | 264/639 |
| 6,503,441 | B2 | * | 1/2003 | Corman et al. ............ | 264/635 |

* cited by examiner

Primary Examiner—Mark L. Bell
Assistant Examiner—Patricia L. Hailey
(74) Attorney, Agent, or Firm—Keil & Weinkauf

(57) ABSTRACT

The core/jacket catalyst molding with a core made from an inorganic support material and with a jacket made from a catalytically active material can be prepared by coextruding an aqueous molding composition which comprises the support material or a precursor thereof, with an aqueous molding composition which comprises the catalytically active material or a precursor thereof, then drying the coextrudate, and then calcining the dried coextrudate.

16 Claims, No Drawings

CORE/JACKET CATALYST MOLDING

The invention relates to core/jacket catalyst moldings, a process for their preparation, and their use in the catalysis of reactions of organic compounds.

The present invention relates in particular to a ceramic molding having more than one layer and composed of at least two differently composed, concentrically arranged zones, at least one zone being a catalytically active material.

Many chemical reactions use catalysts to improve the yield and space-time yield of the reaction. In most cases, the catalyst here is employed in the form of a molding in a fixed-bed reactor through which the starting materials are then passed. The moldings used are extrudates, beads, tablets or other agglomerates. These moldings have to have at least a certain stability to mechanical loads, otherwise they would break up in the reactor under the conditions of the reaction. This is one reason for the fact that moldings of this type are rarely composed solely of the catalytically active composition, but mostly comprise an additional component for mechanical stabilization, the support. Another task frequently carried out by the support is to ensure the presence of a certain pore structure, which guarantees rapid transport of the starting materials and products into and out of the molding.

There are various processes for preparing catalysts of this type. For example, an existing molding made from support material may be saturated with a solution of the catalytically active composition, or of a precursor thereof. Depending on the interaction between support and saturating solution, this saturation process produces a particular distribution pattern of the active components over the cross section of the molding. In most cases, the control of this distribution pattern through the expansion of the phases is difficult, and the pattern practically always involves gradients of active component concentration along the penetration path of the active-component precursor. The support may also be combined with the active component at an early stage, prior to the molding process. There is generally then no control of a distribution pattern during the process of producing the molding, but what is achieved is homogeneous and uniform distribution of the active component.

Another preparation method is to apply a layer made from active components to a mostly non-porous ceramic support, applying a powder together with a solution or with a suspension to the support molding. Here, it is possible to some extent to produce an active component layer of well-defined thickness. However, a disadvantage of this type of preparation is the low mechanical bond strength between the support and the layer produced from powder. This type of catalyst is therefore used only in specific gas-phase partial oxidation processes. The layers applied are readily released under higher mechanical loads.

The reactions catalyzed produce intermediates or final products which with prolonged residence time in the vicinity of catalytically active centers react further to form undesirable, yield-reducing byproducts, the catalyst molding has to be structured so as to avoid these prolonged residence times. One possibility here is the use of moldings with only a thin layer made from catalytically active material. Methods for establishing this type of layer or distribution pattern have been described above. However, all of these methods have disadvantages. Either the distribution pattern or the layer thickness cannot be established with precision or the layer applied lacks sufficient mechanical stability. In addition, all of the processes for preparing these catalysts are complicated.

It is an object of the present invention to provide a mechanically stable molding whose layer of catalytically active material has a defined thickness on an inert supporting core, and to provide a process for its preparation.

We have found that this object is achieved by way of a core/jacket catalyst molding with a core made from an inorganic support material and with a jacket made from a catalytically active material, capable of preparation by coextruding an aqueous molding composition which comprises the support material or a precursor thereof, with an aqueous molding composition which comprises the catalytically active material or a precursor thereof, then drying the coextrudate, and then calcining the dried coextrudate.

This catalytically active material preferably catalyzes the hydrogenation dehydrogenation, oxidation, isomerization or polymerization, or addition reactions, substitution reactions or elimination reactions of organic substances. The catalytically active material preferably comprises metals or metal compounds of the 5th to 8th transition group of the Periodic Table, of groups IB or IIB, of the lanthanoids, of the elements Sn, Pb, As, Sb, Bi, Se or Te, or a mixture of these.

In particular, we have found that this object is achieved by preparing the molding from two reaction mixtures, by extruding the two mixtures concentrically through a specific coextrusion die (i.e. ideally in the form of a cylinder within a tubular jacket). The composition for the core of the extrudate here will be composed mainly of a support material which is inert in the particular reaction to be catalyzed, and the composition for the outer layer or, respectively, the outer layers will comprise an active component or precursor thereof.

There has to date been no disclosure of ceramic coextruded moldings in the form of a coextrudate in which a thin-walled jacket composed of catalyst material is extruded onto a cylindrical core so as to give a form-fit.

If ceramic powders are to be capable of extrusion to give moldings, additives are fed to the powder in a compounding step and give the molding composition some degree of plasticity, which in turn is a precondition for the molding process which follows. Once the molding process has been completed, the plasticizer should be capable of being removed from the resultant molding leaving very little residue, since the catalytic properties of its jacket layer are impaired by even small proportions of foreign substances. To obtain a dimensionally stable molding, it is also advantageous for binders, or what are known as bridgers, to be added to the molding compositions. These permit the formation of solids bridges during the final calcining process. As an alternative, or in addition, the powder to be extruded may also be peptized by contact with acids or bases, forming reactive groups on the particle surfaces, these groups then giving the molding increased strength in a subsequent annealing step via formation of solids bridges.

The aqueous molding composition which comprises the support material or comprises a precursor thereof preferably comprises a mixture made from

| | |
|---|---|
| 10–30% by weight | of at least one water-soluble binder, |
| 25–50% by weight | of at least one inorganic support material or precursor thereof, |
| 2–20% by weight | of at least one peptizing agent, |
| 1–5% by weight | of at least one plasticizer, |
| 20–60% by weight | of water, | where the total amount of the ingredients gives 100% by weight.

The aqueous molding composition which comprises the catalytically active material or comprises a precursor thereof preferably comprises a mixture made from

| | |
|---|---|
| 10–30% by weight | of at least one water-soluble binder, |
| 0–20% by weight | of at least one inorganic support material or precursor thereof, |
| 10–40% by weight | of at least one catalytically active material or of a precursor thereof |
| 2–20% by weight | of at least one peptizing agent, |
| 1–5% by weight | of at least one plasticizer, |
| 0.5–2% by weight | of at least one lubricant, |
| 20–60% by weight | of water, | where the total amount of the ingredients gives 100% by weight.

The molding compositions used for this preparation process preferably have essentially the same shrinkage behavior on drying.

Support materials which may be used are preferably oxides, hydroxides or carbonates of the elements B, Al, Ga, Si, Ti, Zr, Zn, Mg or Ca, or a mixture of these. Other suitable support materials are activated carbon, graphite, and inorganic nitrides or carbides, and mixtures of these. It is also possible to use compounds (precursors) which give the abovementioned substances after appropriate heating.

The catalytically active composition is preferably a catalyst composition which can be used for the hydrogenation, oxidation, isomerization or polymerization of organic substances. When fed to the extrusion process, these catalytically active compositions may be in pure form or diluted with other substances, such as the support materials mentioned. Catalyst compositions suitable for the reactions mentioned are preferably metals or metal compounds of the 5th to 8th transition group of the Periodic Table, or else of groups IB or IIB. Examples which should be mentioned are compounds of the elements V, Nb, Ta, Cr, Mo, W, Mn, Re, Fe, Co, Ni, Cu, Zn, Ru, Rh, Pd, Ag, Os, Ir, Pt and Au. Mention should also be made of compounds of the lanthanoids, and also those of the elements Sn, Pb, As, Sb, Bi, Se and Te.

The materials of the support layer, and also those of the catalytically active layer, may comprise compounds of the alkali metals, or else of the alkaline earth metals not mentioned above, as moderators, for example in order to prevent side reactions in a manner which is known in principle.

Methylcelluloses or their derivatives are preferably used as plasticizers or flow agents. It is particularly preferable to use methylhydroxypropylcellulose as plasticizer. This plasticizer is water-soluble and forms a liquid phase into which the ceramic particles become incorporated. The higher the proportion of plasticizer, based on the amount of water added, the higher is the viscosity and the flow threshold of the compound. This property is significant especially in the preparation of honeycombs, since the honeycombs have to remain dimensionally stable after leaving the extrusion die. For example, MHPC 2000 P methylhydroxypropylcellulose from Aqualon produces a viscosity of from 20,000 to 27,500 mPas in 2% strength aqueous solution. The use of methylcelluloses as plasticizers also has a favorable effect on the flow performance and deformation performance of the reaction mixtures. For example, what is known as the inlet pressure loss is markedly lowered, resulting in a smaller overall pressure drop over the length of the die. Since the moldings of the invention do not have to have very high dimensional stability while green, it is particularly preferable for the amount of methylhydroxypropylcellulose added to reduce the inlet pressure loss and to improve the flexibility of the molding compositions to be only small, from 4 to 8%.

The reaction mixture for the jacket also includes lubricants, preferably wax emulsions and/or fatty acid mixtures. The use of these can reduce wall friction and fine-tune the rheological properties of the molding compositions of the invention.

The binders preferably used according to the invention are inorganic oxides and/or hydroxides which can be very finely dispersed under the conditions of extrusion and increase the mechanical strength of the extrudates by forming solids bridges during the subsequent step of drying and annealing. Examples of suitable binders are boehmite (AlOOH), $SiO_2$ sols (Ludox®) or $TiO_2$ sols, and/or silicic esters of various alcohols.

The molding compositions used according to the invention preferably have a makeup which renders them extrudable. The extrusion behavior of the two components here should preferably have been matched to one another. For example, the two molding compositions may have similar extrusion behavior.

For the moldings of the invention to be capable of industrial use, the catalytically active jacket should have long-lasting adhesion to the core. For reasons associated with materials, function and process, the liquid phase and the plasticizer are intended to be removed again from the molding. The removal of the liquid phase and of the plasticizer shrinks the ceramic coextrudate to an extent which is sometimes considerable, up to 15%. The degree of shrinkage here is highly dependent on the mixing specification. For the preparation of a high-quality ceramic coextrudate the shrinkage of the two molding compositions should be substantially, virtually or entirely identical. The formulations of the molding compositions forming the molding should therefore have been matched to one another in such a way that the degree of shrinkage of the two molding compositions is virtually identical, so as to achieve particularly long-lasting form-fit bonding of the jacket on the core.

The degree of shrinkage of a reaction mixture is frequently determined by the particle geometry, the solids components, and the proportion of liquid phase. The important factors for particle geometry are particle size and particle size distribution. In addition, attention has to be paid to each solids content. These parameters are preferably virtually or entirely identical for the two molding compositions.

Preparation of the moldings of the invention requires at least two different reaction mixtures, namely one for the cylindrical core and the second for the catalyst-containing jacket. The proportion of binder in the reaction mixture for the core is preferably from 15 to 25% by weight. The proportion of support is preferably from 35 to 42% by weight, and the proportion of peptizing agent introduced into the formulation is preferably from about 4 to 14% by weight, that of the plasticizer being preferably from about 1 to 3% by weight, based in each case on the entire reaction mixture. The remainder is water. The solids components present may have different particle sizes.

The reaction mixture for the jacket comprises a preferred proportion of from 15 to 21% by weight of the binder, a preferred proportion of from about 0 to 16% by weight of the carrier, a preferred proportion of from about 15 to 31% by weight of the catalyst, a preferred proportion of from about 5 to 15% by weight of the peptizing agent, a preferred proportion of from about 1 to 3% by weight of the plasticizer, and a preferred proportion of from 0.5 to 1.5% by weight of the lubricant, based in each case on the entire reaction mixture. The remainder is water. Here again, the solids components present may have different particle sizes. The use of reaction mixtures of this type for preparing the molding of the invention gives moldings with excellent catalytic and mechanical properties.

The invention also provides a process for preparing the molding of the invention composed of two reaction mixtures which comprise carrier, catalyst material, binder, plasticizer and lubricant. This is achieved by carrying out the process steps given. The molding of the invention is preferably composed of a cylindrical core extrudate with a diameter of preferably from 1 to 8 mm, with preference from 2.5 to 5.0 mm, onto which is extruded a thin jacketing layer with a wall thickness of preferably from 0.1 to 1.0 mm. While the core extrudate gives the coextrudate strength, the thinner jacket gives the coextrudate its functionality.

The process for preparing the molding of the invention can be subdivided into the following sub-steps:

preparation of the reaction mixtures, molding by means of a coextrusion process, drying the coextrudates, and calcining the dried coextrudates.

The reaction mixture for the jacket and for the core is preferably prepared in a laboratory kneader equipped with two counter-rotating Sigma blades. The components here are charged batchwise to the kneader trough and mixed until the molding composition produced is plastic, and this can then be molded or extruded to give the moldings of the invention. The reaction mixtures may also be prepared continuously in a twin-screw kneader (ZSK).

The molding of the invention is molded by a coextrusion process. No molding process of this type using ceramic materials has hitherto been practiced in the prior art. Coextrusion processes in the prior art process polymer melts. In the coextrusion process here the melt streams supplied by more than one extruder are combined in a single die so as to give the desired layered structure. Combinations having up to seven layers are prior art for films or hollow articles.

The coextrusion of ceramic molding composition differs from the multilayer extrusion of thermoplastic melts in a number of aspects. The melt flows supplied by two extruders are combined in a coextrusion die in such a way as to give the layered structure described. A ram extruder is preferably used for conveying the jacket composition, and a single-screw extruder is preferably used for the core composition. However, in principle use may also be made of two single-screw extruders or twin-screw extruders. The substantive differences from previously known coextrusion processes for organic compositions are to be found in the structure and in the rheological properties of the molding compositions of the invention. Unlike the organic polymer melts, the molding compositions of the invention are highly filled and therefore very highly viscose systems with a flow threshold, which are processed at ambient temperature. These systems require a specific design of die with regard to their specific flow behavior within the die and in particular with regard to weld line formation at locations of coinciding flow. For reasons of plastic deformation and flow behavior of the molding compositions, the formulations of the reaction mixtures are important for successful coextrusion, alongside the design of the die. Since the die resistance factor for the jacket-extrusion area is markedly greater than that for the geometrically simple core-extrusion area, the reaction mixture of the invention for the jacket has to have lubricant added.

The coextrusion die is preferably a side-fed die, as also used in modified form for extruding pipe or blown film, using polymer melts. The coextrusion die is to be capable of shaping two ceramic molding compositions in such a way that a thin jacketing layer is extruded onto a cylindrical core in a single process. It is preferable here to combine a single-screw extruder (core) and a ram extruder (jacket).

An important component of the coextrusion die is the mandrel which supports the melt-distributor system. While the core molding composition delivered by the single-screw extruder is passed directly through the inner melt channel of the mandrel to the die, the jacket molding composition delivered by the ram extruder is diverted through 90°. The diverted jacket composition is then passed around the mandrel by way of a melt-distributor channel incorporated into the mandrel arrangement. The flow profile is uniform within the restricted flow zone around the entire periphery of the mandrel arrangement and encounters the core composition in the area of the discharge die. In the final subsection of the discharge die, the jacket is then applied to the core to give a form-fit.

The design of the shaping area of the coextrusion die is such as to produce a coherent outer layer of constant wall thickness over the entire periphery, despite the complex non-linear plastic flow behavior of the molding compositions. In this context, it is also possible to use a double or multiple mandrel arrangement as well as the single-mandrel arrangement used currently. The shape of the distributor channel and of the downstream flow restrictor gap or, respectively, restricted flow zone in these dies is such that at the mandrel arrangement die orifice, where the two melt flows encounter one another, there is inevitably a uniform on average flow velocity over the entire periphery.

The design of the melt-distributor channel is based on the characteristic rheological properties of the molding compositions. To determine the rheological properties, a high-pressure capillary rheometer is used to produce the flow curves for the molding compositions. The rheological equation of state used here is the Ostwald-deWaele power law, since this law has proven successful in describing non-linear Casson media for $\iota > \iota_0$. In the calculations for the melt-distributor channel, particular importance is attached to the flow exponent m, since it is a measure of the structural viscosity of the molding compositions. It has been found that a good approximation for the design of the melt-distributor channel can be made during the modeling process by assuming a high flow exponent m in the range $5 \leq m \leq 10$.

Other important design details are the centering of the discharge die and the area of confluence of the molding compositions.

The design of the area of confluence of the molding compositions should be such that there is a very small distance between the core aperture and the discharge aperture, and such that the jacket molding composition and the core molding composition flow simultaneously into the discharge aperture. Another important point for the quality of the coextrudate is the centering of the discharge aperture with respect to the mandrel system. Even a small deviation in the region of 0.2 mm causes the concentric arrangement of the jacket with respect to the core to be lost. The die resistance of the die discharge aperture must be sufficiently high that the jacket bonds firmly to the core. Another particular reason for the importance of high pressure in the discharge die area is firm bonding of the jacket compositions in the area of the weld line.

For high-viscosity molding compositions with flow thresholds, care has generally to be taken that there are no dead spaces in which material can stagnate, forming uncontrolled flow channels. These particularly include areas of diversion, narrowings of cross section and widenings of cross section. Widenings of cross section are particularly susceptible to these problems and should therefore be avoided. For narrowings of cross section the inlet angle used should be very acute, not more than 30°.

In contrast to the coextrusion of polymer melts, where the coextrudate retains its dimensions after cooling and there are normally no further changes made to the material, the process for the ceramic coextrudate requires the operations of drying and calcination after molding, and in these the liquid phase, the plasticizers and the organic additives are removed from the extrudate, and the binder assumes the function of a bridger and develops strength. The extrudate shrinks by up to 15% due to the withdrawal of the liquid phase in the course of the drying process. The makeup of each of the reaction mixtures for jacket and core is therefore important for this process step. It is preferable for the two reaction mixtures to be matched precisely to one another with respect to their shrinkage behavior, so that no stresses arise between core and jacket during shrinkage. The drying process should preferably take place in a uniform and gentle manner over the entire periphery of the molding of the invention, and preferably at from about 60 to 120° C. After drying, the extrudates are calcined, preferably at from 400 to 1200° C., whereupon the plasticizer and the lubricant are removed and the binder forms solids bridges.

The examples below give further illustration of the invention.

EXAMPLES

The examples below use MHPC 20000 P methylcellulose derivative (from Aqualon) as plasticizer. The binder used comprises Pural® SB hydrated aluminum hydroxide (from Condea), which dehydrates at from about 300 to 500° C. to give $\gamma$-$Al_2O_3$. 20% strength formic acid is also present in the reaction mixture, and is used as additional plasticizer, and also for improving binder strength. For the jacket, use is also made of a fatty acid with nonionic Zusoplast 126/3 emulsifier (from Zschimmer & Schwarz), as lubricant.

Example 1

The catalyst composition used comprises a $CuO/Al_2O_3$ powder with 50% by weight of CuO, prepared by precipitating the components, filtration, converting the filter paste to a slurry, and then spraying the slurry.

The reaction mixture for preparing the core of the molding of the invention, made from porous aluminum oxide, includes 150 g of Puralox® aluminum oxide powder (from Condea), ground to a particle size of about 5 $\mu$m, 100 g of Pural® hydrated aluminum oxide hydroxide, 7.5 g of MHPC 20000 P methylhydroxypropyl-cellulose, and 170 g of 20% strength formic acid.

The reaction mixture for preparing the jacket of the molding of the invention made from porous aluminum oxide and catalyst material includes 96 g of R3-18 copper catalyst, 72 g of Puralox® aluminum oxide powder, unground, with particle size from about 60 to 150 $\mu$m, 72 g of Pural® hydrated aluminum oxide hydroxide, preferably 72 g, 12 g of MHPC 20000 P methylhydroxypropyl-cellulose, preferably 12 g, 210 g of 20% strength formic acid, preferably 210 g, and 6 g of Zusoplast® 126/3 lubricant.

A Zwick Z 010 hardness tester was used to determine cutting hardness.

A molding was produced, composed of the two reaction mixtures mentioned. The reaction mixtures for the core and the jacket are compounded in a Werner & Pfleiderer LUK 0.75 laboratory kneader equipped with Sigma blades.

In this case a ram extruder was used for the jacket composition, and a single-screw extruder (D=30 mm) for the core composition. The advantages of the ram extruder are that the forced conveying system can even process very soft and tacky mixes, and the extrusion rate can be adjusted very precisely via the ram advance. In order to obtain a thin outer jacket in the range from 0.3 to 0.5 mm, the extrusion rate for the ram extruder is kept small in comparison to that of the single-screw extruder. During process, care should be taken that there is sufficient cooling of the processing zones in the extruder. The temperature should not exceed 20° C., since otherwise the flow behavior of the molding compositions can be impaired significantly and the quality of the molding can decline.

The molding prepared in this way was then dried for two hours in a circulating-air drying cabinet at 180° C., whereupon it shrank by up to 15% by volume. It was then calcined in a muffle furnace at from 500 to 800° C., giving cutting hardnesses of up to 93.8 N.

Example 2

The carrier material used in this example comprises Puralox® aluminum oxide powder (from Condea). The catalyst composition used comprises a $PdO/Al_2O_3$ powder with 0.5% by weight of PdO, prepared by precipitating the components, filtration, converting the filter paste to a slurry, and then spraying the slurry.

Use is also made of MHPC 20000 P methylcellulose derivative (from Aqualon) as plasticizer. The binder used comprises Pural® SB hydrated aluminum hydroxide (from Condea), which dehydrates at from about 300 to 500° C. to give $\gamma$-$Al_2O_3$. 20% strength formic acid is also present in the reaction mixture, and is used as additional plasticizer, and also for improving binder strength. For the jacket, use is also made of a fatty acid with nonionic Zusoplast® 126/3 emulsifier (from Zschimmer & Schwarz), as lubricant.

The reaction mixture for preparing the core of the molding of the invention, made from porous aluminum oxide, includes 150 g of Puralox® aluminum oxide powder (from Condea), ground to a particle size of about 5 $\mu$m, 100 g of Pural® hydrated aluminum oxide hydroxide, 7.5 g of MHPC 20000 P methylhydroxypropyl-cellulose, and 170 g of 20% strength formic acid.

The reaction mixture for preparing the jacket of the molding of the invention made from porous aluminum oxide and catalyst material includes 130 g of palladium catalyst, 130 g of Pural® hydrated aluminum oxide hydroxide, 15.6 g of MHPC 20000 P methylhydroxypropyl-cellulose 230 g of 20% strength formic acid and 6 g of Zusoplast® 126/3 lubricant.

A molding was produced, composed of the two reaction mixtures mentioned, the wall thickness being about 0.2 mm.

The reaction mixtures for the core and the jacket were compounded in a Werner & Pfleiderer LUK 0.75 laboratory kneader equipped with Sigma blades.

In this case a ram extruder was used for the jacket composition, and a single-screw extruder (D=30 mm) for the core composition. In order to obtain a thin outer jacket of about 0.2 mm, the extrusion rate for the ram extruder is kept very small in comparison to that of the single-screw extruder, and the jacket molding composition had to have a low flow threshold. During processing, care should be taken that there is sufficient cooling of the processing zones in the extruder. The temperature should not exceed 20° C., since otherwise the flow behavior of the molding compositions can be impaired significantly and the quality of the molding can decline.

The molding prepared in this way was then dried at 20° C. (room temperature), whereupon it shrank by up to 12% by volume. It was then calcined in a muffle furnace at from 500 to 800° C., giving cutting hardnesses of up to 106 N.

We claim:

1. A core/jacket catalyst molding having a core made from an inorganic support material and with a jacket made from a catalytically active material, which is the product of the process of:

coextruding an aqueous molding composition which comprises the support material or a precursor thereof, with an aqueous molding composition which comprises the catalytically active material or a precursor thereof, wherein an arrangement of two extruders is selected for the preparation process so that during the extrusion process a jacketing phase made from catalytically active material concentrically surrounds a compact core made from support material, then drying the coextrudate, and then calcining the dried coextrudate;

and wherein the aqueous molding composition which comprises the support material or comprises a precursor thereof comprises a mixture made from

| | |
|---|---|
| 10–30% by weight | of at least one water-soluble binder, |
| 25–50% by weight | of at least one inorganic support material or precursor thereof, |
| 2–20% by weight | of at least one peptizing agent, |
| 1–5% by weight | of at least one plasticizer, |
| 20–60% by weight | of water, | where the total amount of ingredients gives 100% by weight.

2. A catalyst molding as claimed in claim 1, wherein the catalytically active material catalyzes the hydrogenation, dehydrogenation, oxidation, isomerization or polymerization, or addition reactions, substitution reactions or elimination reactions of organic substances, and comprises metals or metal compounds of the 5th to 8th transition group of the Periodic Table, of groups IB or IIB, of the lanthanides, of the elements Sn, Pb, As, Sb, Bi, Se or Te, or a mixture of these.

3. A catalyst molding as claimed in claim 1, wherein the support material used comprises oxides, hydroxides or carbonates of the elements B, Al, Ga, Si, Ti, Zr, Zn, Mg or Ca, or a mixture of these.

4. A catalyst molding as claimed in claim 1, wherein the support material used comprises activated carbon, graphite, and inorganic nitrides or carbides, or a mixture of these.

5. A catalyst molding as claimed in claim 1, wherein the aqueous molding composition which comprises the catalytically active material or comprises a precursor thereof comprises a mixture made from

| | |
|---|---|
| 10–30% by weight | of at least one water-soluble binder, |
| 0–20% by weight | of at least one inorganic support material or precursor thereof, |
| 10–40% by weight | of at least one catalytically active material or of a precursor thereof |
| 2–20% by weight | of at least one peptizing agent, |
| 1–5% by weight | of at least one plasticizer, |
| 0.5–2% by weight | of at least one lubricant, |
| 20–60% by weight | of water, | where the total amount of ingredients gives 100% by weight.

6. A catalyst molding as claimed in claim 5, wherein the catalytically active material catalyzes the hydrogenation, dehydrogenation, oxidation, isomerization or polymerization, or addition reactions, substitution reactions or elimination reactions of organic substances, and comprises metals or metal compounds of the 5th to 8th transition group of the Periodic Table, of groups IB or IIB, of the lanthanides, of the elements Sn, Pb, As, Sb, Bi, Se or Te, or a mixture of these.

7. A catalyst molding as claimed in claim 5, wherein the support material used comprises oxides, hydroxides or carbonates of the elements B, Al, Ga, Si, Ti, Zr, Zn, Mg or Ca, or a mixture of these.

8. A catalyst molding as claimed in claim 5, wherein the support material used comprises activated carbon, graphite, and inorganic nitrides or carbides, or a mixture of these.

9. A catalyst molding as claimed in claim 5, wherein the molding compositions used for the preparation process have essentially the same shrinkage behavior on drying.

10. A catalyst molding as claimed in claim 1, wherein the molding compositions used for the preparation process have essentially the same shrinkage behavior on drying.

11. A process for preparing a core/jacket catalyst molding, which comprises carrying out the following steps:

coextruding an aqueous molding composition which comprises the support material or a precursor thereof, with an aqueous molding composition which comprises the catalytically active material or a precursor thereof, wherein an arrangement of two extruders is selected for the preparation process, so that during the extrusion process a jacketing phase made from catalytically active material concentrically surrounds a compact core made from support material, then drying the coextrudate, and then calcining the dried coextrudate.

12. A core/jacket catalyst molding having a core made from an inorganic support material and with a jacket made from a catalytically active material, which is the product of the process of:

coextruding an aqueous molding composition which comprises the support material or a precursor thereof, with an aqueous molding composition which comprises the catalytically active material or a precursor thereof, wherein an arrangement of two extruders is selected for the preparation process so that during the extrusion process a jacketing phase made from catalytically active material concentrically surrounds a compact core made from support material, then drying the coextrudate, and then calcining the dried coextrudate;

and wherein the aqueous molding composition which comprises the catalytically active material or comprises a precursor thereof comprises a mixture made from 10–30% by weight of at least one water-soluble binder, 0–20% by weight of at least one inorganic support material or precursor thereof, 10–40% by weight of at least one catalytically active material or of a precursor thereof, 2–20% by weight of at least one peptizing agent, 1–5% by weight of at least one plasticizer, 0.5–2% by weight of at least one lubricant, 20–60% by weight of water, where the total amount of ingredients gives 100% by weight.

13. A catalyst molding as claimed in claim 12, wherein the catalytically active material catalyzes the hydrogenation, dehydrogenation, oxidation, isomerization or polymerization, or addition reactions, substitution reactions or elimination reactions of organic substances, and comprises metals or metal compounds of the 5th to 8th transition group of the Periodic Table, of groups IB or IIB, of the lanthanides, of the elements Sn, Pb, As, Sb, Bi, Se or Te, or a mixture of these.

14. A catalyst molding as claimed in claim 12, wherein the support material used comprises oxides, hydroxides or carbonates of the elements B, Al, Ga, Si, Ti, Zr, Zn, Mg or Ca, or a mixture of these.

15. A catalyst molding as claimed in claim 12, wherein the support material used comprises activated carbon, graphite, and inorganic nitrides or carbides, or a mixture of these.

16. A catalyst molding as claimed in claim 12, wherein the molding compositions used for the preparation process have essentially the same shrinkage behavior on drying.

* * * * *